Oct. 22, 1940.  C. G. BINDER ET AL  2,219,147
ELECTRICAL CONTROL APPARATUS
Filed Aug. 31, 1937   3 Sheets-Sheet 1
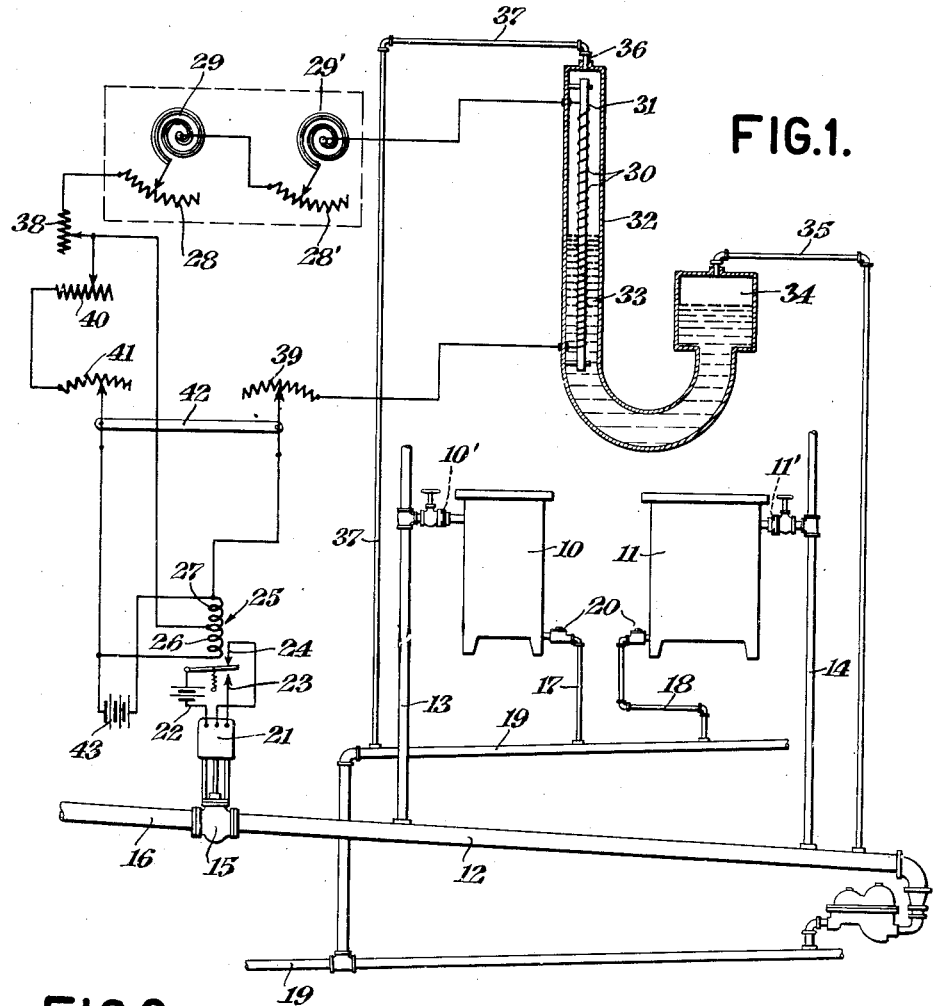
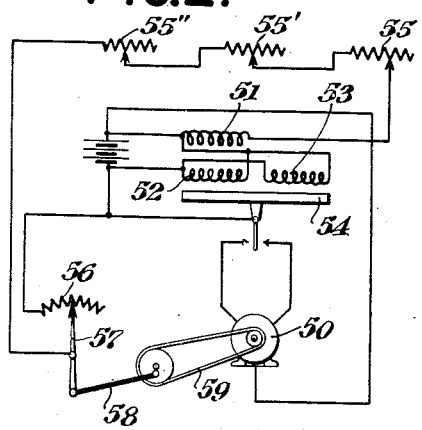
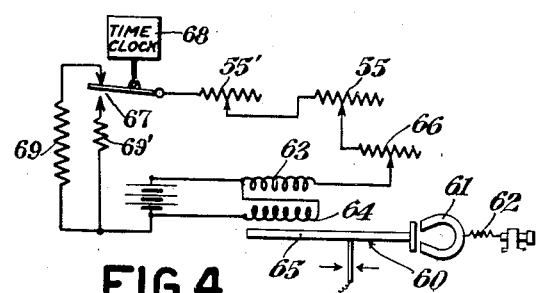
INVENTORS
CHARLES G. BINDER
LEROY H. PLUM
BY
Ward, Crosby + Neal
ATTORNEYS Oct. 22, 1940.                C. G. BINDER ET AL                 2,219,147
                         ELECTRICAL CONTROL APPARATUS
                         Filed Aug. 31, 1937          3 Sheets-Sheet 2

INVENTORS
CHARLES G. BINDER
LEROY H. PLUM
BY
Ward, Crosby + Neal
ATTORNEYS

Oct. 22, 1940.   C. G. BINDER ET AL   2,219,147
ELECTRICAL CONTROL APPARATUS
Filed Aug. 31, 1937   3 Sheets-Sheet 3

INVENTORS
*CHARLES G. BINDER*
*LEROY H. PLUM*
BY
ATTORNEYS

Patented Oct. 22, 1940

2,219,147

UNITED STATES PATENT OFFICE 2,219,147

ELECTRICAL CONTROL APPARATUS

Charles G. Binder, Merchantville, and Leroy H. Plum, Collingswood, N. J., assignors to Warren Webster & Company, Camden, N. J., a corporation of New Jersey Application August 31, 1937, Serial No. 161,802

7 Claims. (Cl. 236—92)

This invention relates to the construction and operation of electrical control circuits and arrangements, for regulating the flow of fluids, such for example as fluid heat transferring mediums.

Although the invention is particularly adapted to the regulation of the pressure or flow of steam in a steam heating system, certain features thereof may be equally applicable to the control of other heating mediums, such as the fuel supply for heating apparatus or the flow of hot water or hot air to heating systems, or the control of the stopping, starting or regulation of refrigerating, or air conditioning equipment.

Certain forms of the invention are particularly adapted among other purposes, for use in connection with steam heat controlling systems of the general type disclosed in the copending application of Karl W. Rohlin, Ser. No. 20,012, filed May 6, 1935, (now Patent No. 2,090,073, granted August 17, 1937) and entitled "Method and apparatus for controlling heating systems," reference to which is hereby made. In said application control systems are disclosed wherein a reversible motor operated main steam valve is provided under the control of several electrical circuits. These circuits in turn are controlled by a mercury column or other element movable in response to variations in pressure of the steam which is controlled. A series of contacts are provided in connection with the mercury column, one or more of these contacts being selected for connection in circuit by a thermostat or by a manually adjustable multi-contact switch. Then the arrangement is such that the valve is normally operated in one direction for a short period and until the resulting pressure changes cause the top of the mercury column to become substantially spaced from the selected contact, whereupon the valve motor is reversed, whereby the steam pressure on the mercury column is restored to a value for bringing the top of the mercury column back to the selected contact. The use of a series of contacts engaging the mercury column with such apparatus may sometimes involve troublesome arcing eventually resulting in deterioration of the contacts. Such apparatus also involves the use of a multi-wire cable from the contacts running to the multi-contact manually adjustable switch and to a multi-contact thermostat. On the other hand with the present invention, the series of contacts at the mercury column or equivalent movable element, may be replaced by a resistance member, and a circuit may be provided for this resistance member in such form that only a single pair of wires, or a single wire with ground return, may be provided to the manually adjustable switch and to the thermostat. Thus the present invention makes possible a circuit arrangement which is considerably simplified and less expensive to construct, install and maintain while at the same time being more accurate and dependable in operation.

Various further and more specific objects, features and advantages will clearly appear from the detailed description given below taken in connection with the accompanying drawings forming a part of this specification and illustrating by way of example various preferred embodiments of the invention.

The invention consists in such novel features, arrangements combinations of parts and operations thereof, as described in connection with the apparatus herein disclosed by way of example only.

In the drawings,

Fig. 1 comprises a schematic diagram of a heating system equipped with one example of the apparatus embodying the inention;

Fig. 2 schematically illustrates an alternative embodiment of the circuit involving the invention;

Fig. 3 schematically illustrates an arrangement of apparatus which the circuit of Fig. 2 is particularly adapted to control;

Fig. 4 schematically illustrates a further alternative embodiment of the circuit involving the invention;

Figure 3:
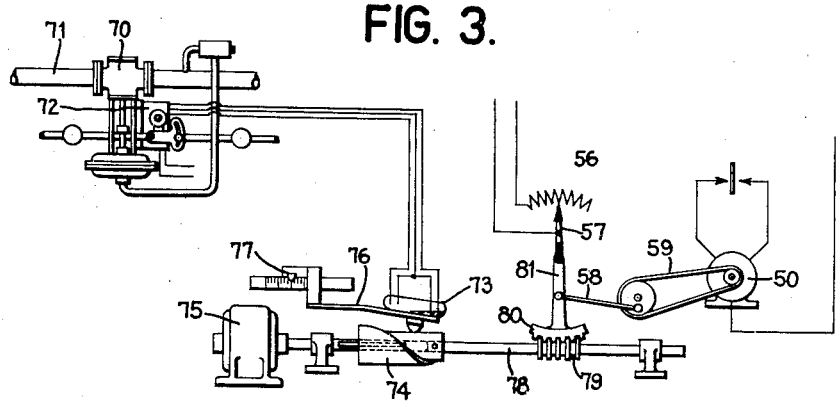

Referring now to Fig. 1, the system there shown may comprise a plurality of radiators as at 10 and 11 located in various spaces or rooms of the structure to be heated. These radiators may be connected either to a so-called "one pipe" system, or a "two pipe" system providing for return of the condensate independently of the steam supply. In the particular example shown, a "two pipe" system is used embodying a steam main 12 with risers to various parts of the structure as at 13 and 14. The steam main may be connected through a main control valve 15 to a supply conduit as at 16 running from a boiler, a central heating plant or other source of steam supply at either a varying or more or less constant pressure, higher than the maximum pressure required in the steam main 12.

In the conduits to each of the radiators respectively, preferably adjacent the inlets thereof, normally fixed orifice members may be provided as at 10' and 11'. These orifices are preferably formed with apertures of a predetermined size for restricting the flow of steam to each radiator to an extent depending on the normal heating capacity thereof and the access of the steam source to each radiator. That is, these orifices are so proportioned by calculation or trial that steam is supplied to each radiator respectively in amounts bearing substantially the same proportional relationship for each radiator to its heating capacity.

The various radiators may be connected with condensate return pipes as at 17 and 18 extending to a return main 19 which may be of the "open return" type for the gravity return flow of the condensate, or preferably with the particular arrangement shown, of the "closed return" type where the return main 19 communicates with any suitable well-known type of apparatus for maintaining a partial vacuum therein.

The outlets of each of the radiators to the return piping may preferably be provided with steam traps as at 20 of a suitable well-known type adapted to normally permit condensate to escape, but closing against the exit of steam.

The valve 15 may be operated by a reversible electric motor 21 provided with circuit connections 22 and 23 for operating the motor in a direction to open the valve and connections 22 and 24 for operating the motor in the opposite direction to close the valve. A relay 25 having two magnet windings, for example as at 26 and 27, may be provided for controlling these connections, this relay having a "break" contact for the connection 23 and a "make" contact for the connection 24, so that depending upon the position of the relay, the motor 21 will be operated in a direction to turn the valve 21 either toward open position or closed position.

The relay windings 26 and 27 respectively may be controlled by the two branches of a bridge circuit, which will now be described. One branch of this circuit, for example the one embodying the winding 27, may include one, two or more thermostatically adjustable resistance elements as at 28 and 28', the adjustable contacts of which may be controlled respectively as by thermostatic bi-metallic strips as at 29 and 29'. These thermostatic elements may preferably be located out of doors or at some point outside the rooms or spaces heated by the system, although the invention in some of its phases is applicable to systems wherein one or more of these thermostatic elements is located within and/or outside the spaces heated. Usually but one of the thermostatic elements need be used, but two or more may be used and located at different points around the outside of a building, for example, so that conjointly they will give a measure of the average outdoor temperature conditions according to which the system is to be regulated.

One or the other of the branches of the bridge circuit, preferably the same branch which embodies the thermostatically controlled resistance, may also embody a resistance element as at 30 which is varied as a result of variations, for example, of the pressure conditions in the flow of heating medium which has passed through the control valve 15. For this purpose the resistance element 30 may be arranged in a helical or other suitable form supported by an insulating rod 31, within one arm of a U-tube 32 containing a column of mercury or other suitable conductive liquid as at 33. The other arm of the U-tube may be formed with a small reservoir as at 34 having a pressure connection as at 35 running to the steam main 12. The first named arm of the U-tube may be provided at its upper end as at 36 with a pressure connection as at 37 running to the condensate return main 19. Thus the mercury column 33 will be varied in height in accordance with variations in the effective pressure applied to the system, i. e. the difference in pressure between the supply and return mains. In cases where a "one pipe" system is used, the pressure connection 37 may of course be eliminated, whereupon the height of the mercury column will vary in accordance with the steam main pressure variations, which then determine the effective pressure applied to the system.

As the height of the mercury column varies, the extent to which the resistance 30 will be immersed will also vary whereby also the effective resistance of the element 30 will be adjusted as a result of changes in the pressure conditions of the flow of heating medium. In the particular form shown the resistance 30 may be in the form of spiral convolutions surrounding its support. If the thermostatically controlled resistances as at 28 are constructed to vary in resistance directly in accordance with temperature changes, and if it is desired to have the system operate to vary the flow of steam to the various radiators also directly in proportion to the temperature changes, then the spiral convolutions of the resistance 30 should be so wound that those nearest the bottom are quite closely spaced and the higher convolutions are more and more widely spaced. For example, if the system is so constructed that the flow of heating medium is entirely cut off when the prevailing temperature is 70°, then the height of each of the convolutions above that one corresponding to 70° should preferably be substantially directly proportional to the square of the difference between 70° and the temperature corresponding to the convolution at such height. This rule is due to the fact that the quantity of steam flowing through the fixed orifices will vary substantially as the square root of the pressure difference at opposite sides of the orifice. It will be appreciated that in lieu of utilizing a series of convolutions for the resistance 30, such resistance may be provided in other forms such that the amount thereof which is short-circuited or cut out of circuit by the mercury column, or its equivalent, at various different pressures, will vary according to this square root rule.

As shown, the thermostatically controlled resistances and the pressure controlled resistance 30 may be connected in series with the relay winding 27 and also if desired, in series with manually adjustable resistances as at 38 and 39, the purposes of which will be hereinafter described.

The other branch of the bridge circuit may for example include a manually adjustable resistance as at 40 and a further manually adjustable resistance as at 41. The adjustable contacts at resistances 39 and 41 if desired may be mechanically interconnected as by a rod 42, whereby for example, as the resistance in the branch of the circuit including the resistance 41 is reduced, the resistance of the other branch of the circuit will be correspondingly increased. Resistances 39 and 41 may therefore be concurrently given a permanent or semi-permanent adjustment according to the relative effective strengths of the relay windings 26 and 27, so that the two branches of the circuit will cooperate in causing the relay to actuate in one direction or the other when the two branches of the circuit are balanced, or when the total resistances of the two branches respectively have a predetermined relationship.

The manually adjustable resistance 38 may be used to take the place of the multi-contact manually adjustable switch of the system of the Rohlin application above identified. That is, for example, in the heating of buildings at nighttime, during week-ends and holidays, or other periods, it may be desired to provide the steam at a lower pressure than during the usual working hours. Or at other times, such as early morning hours in cold weather, it may be desired to provide steam at abnormally higher pressures. In these cases the attendant may adjust the resistance 38 and thus arbitrarily raise or lower the level of the steam pressure to the desired extent, while the pressure still remains under the regulation as effected by the thermostatic means and pressure controlled resistance 30. The resistance 40 may be given a permanent or semi-permanent adjustment when the system is installed, such adjustment being made so as to give the total resistances of the two branches of the bridge circuit respectively a predetermined relationship.

Current for operating the bridge circuit may be supplied by a battery 43 or other suitable source.

When the arrangement is operating, let us assume that the relay 25 is in the condition to close a circuit through contact 23, whereby current is being applied to the motor 21 in a direction causing the motor to turn the valve toward closed position. As the valve orifice becomes more and more restricted, the difference in pressure between the stream and return mains, for example, will become lower and lower, causing the top of the mercury column 33 to gradually assume a lower position. This in turn will gradually increase the effective resistance of the resistance element 30, thereby increasing the current flow through relay winding 27. When this current flow is increased to a point where the magnetic force caused thereby in coil 27 is able to overcome the magnetic effect of the other relay winding 26 (plus the relay tension spring, if the relay is supplied with a spring as shown), then the relay will be actuated in a direction to disconnect the contact 23 and connect a circuit through connection 24 as shown, whereby the operation of the valve motor is reversed.

Then the valve will be moved toward open position and the steam pressure or the pressure difference in the system will increase, causing the mercury column or its equivalent to rise. This in turn will decrease the effective resistance of the resistance unit 30, resulting in a corresponding decrease of the current flow through the relay winding 27. When the resistance of this branch of the circuit is decreased to a point where it bears a predetermined relationship to the resistance of the other branch of the circuit, then the relay will be actuated, again reversing the valve motor, causing the valve to be operated toward closed position.

Such reversals of the valve will be repeated from time to time, and tend to maintain the mercury column or its equivalent at or adjacent a height such that the resistances of the two branches of the bridge circuit respectively will be balanced or have a predetermined relationship. That is, assuming that the action of the relay 25 has no predetermined bias in either direction, then the bridge circuit may be such that the operation of the valve in conjunction with the mercury column tends to maintain the circuit in balance. However, if the relay is biased as by a spring, or by gravity, or by reason of differences in its two windings, then one branch of the bridge circuit as adjusted by the resistances 39, 40 and 41 may be normally out of balance with the other branch to a corresponding predetermined degree.

During the operation of the system as above described, if the prevailing temperature affecting the thermostatic means remains constant, then the height of the mercury column will fluctuate slightly at a predetermined height corresponding to such temperature. But if the prevailing temperature changes, for example decreases, the resistances controlled by the thermostats will correspondingly increase in value. Thereupon the height of the mercury column will change and fluctuate slightly about a higher level corresponding to the new prevailing temperature. Similarly, if the temperature increases, the mercury column will be regulated at a correspondingly lower level. That is, in substance the effective resistance of element 30 will be regulated at new value corresponding to or compensating for the change in the resistance at the thermostat so as to restore the two branches of the bridge circuit to their former predetermined relationship, while the heating fluid is supplied with an increased or decreased pressure (or pressure difference) as the prevailing temperature may demand.

It will be understood that if it is desired to control the operation of the system merely by manual means, as by adjustments of the resistance 38 from time to time, then the thermostatically controlled resistance of resistances may be omitted. Similarly the resistance 38 may be omitted if it is desired to control the system thermostatically without the arbitrary manual variations. Also the relay 25 and its windings may be so constructed that the resistances 39 and 41 may be omitted. In that event either the resistance 38 or the resistance 40 may be calibrated in a manner depending upon the lengths of the circuit wires in any particular installation and so that the attendant may readily adjust the circuit from time to time during the day or week to obtain the desired heating.

In the modification of the circuit shown in Fig. 2 a reversible electric motor is schematically indicated at 50. This motor may be controlled by a relay having three windings as at 51, 52 and 53 acting upon a centrally pivoted relay armature 54. That is, the coils 52 and 53 may be alike, but positioned so as to act respectively upon opposite ends of the armature 54. The windings 52 and 53 may form the equivalent of one branch of the above described bridge circuit. The equivalent of the other branch of the bridge circuit may be comprised of the winding 51 in series with one or more control resistances as at 55, 55' and 55", and an adjustable "follow-up" resistance 56. One or more of the resistances 55 may be adjusted by a thermostatic means the same as the resistances 28 above described, or otherwise. The "follow-up" resistance 56 may be controlled by a movable element acting as the equivalent of the above described mercury column as a result of pressure changes, or in the specific example shown the resistance 56 is adjusted by means of mechanical connections with the motor 50. That is, for example, an adjustable contact 57 may be arranged to be moved by suitable belt, pulley and linkage or equivalent mechanical connections as at 58 and 59 operated by the motor 50. In this case the "follow-up" resistance is varied in accordance with movements of the motor or the valve operated thereby in lieu of being varied by changes in pressure resulting from the valve movements as in the case of the arrangement of Fig. 1.

The circuit of Fig. 2 is particularly adapted among other purposes for use in connection with steam heat controlling systems of the general type disclosed in the copending application of Karl W. Rohlin, Ser. No. 19,397, filed May 2, 1935. That is, in this type of system, the steam may be turned on during spaced intervals each of thermostatically controlled length and alternating with intervals during which the steam is cut off or substantially checked. Fig. 3 illustrates the manner in which the circuit of Fig. 2 may be applied to control such a system. A main steam valve 70 is here shown in a steam main 71. This valve may be in the form of a pressure regulating valve arranged to be alternately opened and closed by a motor 72 in a manner described in the above mentioned Rohlin application Ser. No. 19,397. That is, the motor 72 is provided with a three-wire circuit controlled by a tiltable mercury switch 73, for example, whereby when the switch is tilted in one direction, the valve will be closed, and when the switch is tilted in the opposite direction, the valve will be opened. The switch 73 may be arranged to be tilted by a cam member 74, which cam is rotated at a substantially constant speed by a motor or clock works 75. The cam 74 is provided with a surface comprising longitudinally extending raised areas varying in width along their length so that as the cam rotates, the switch is alternately tilted for opening the valve during spaced periods. As shown, the switch 73 may be supported by a yieldable member 76, the position of which may be manually adjusted in directions along the axis of the cam 74 as by adjustable supporting means 77. Also as shown, the cam 74 may be slidably mounted along the shaft of the motor 75. The raised areas on the cam are so shaped that the proportion of elapsed time occupied by the "on" intervals of steam supply may be determined by the relative position along its axis of the cam 74 in respect to the switch 73. In order to adjust this position of the cam 74 thermostatically, the cam may be formed with a longitudinal extension 78 provided with a rack or equivalent means 79 for engaging a sector gear 80 for example, mounted upon the lever 81 which carries the adjustable "follow-up" contact 57 above described in connection with Fig. 2. Accordingly, when the circuit of Fig. 2 becomes unbalanced as a result of a change in temperature, operation of motor 50 as above described will result in adjustment of the follow-up resistance 56 to the extent necessary to compensate for such unbalanced condition of the circuit. Concurrently the gear segment 80 acting on the rack 79 will adjust the cam 74 axially to a new position in respect to the tiltable switch 73. Accordingly, the new temperature will result in an axial adjustment of the cam 74, such that the proportion of elapsed time occupied by the "on" intervals will be correspondingly increased for example, if the temperature is lower, or correspondingly decreased if the temperature is higher. When a pressure regulating form of valve is used as at 70, it is unnecessary to use any pressure controlled resistance in the circuit of Fig. 2.

Fig. 4 illustrates another modified form of circuit in which a relay 60 is provided, having a permanent magnet as at 61 and an adjustable spring as at 62 or other well-known means for biasing the same. This relay may be provided with two coils as at 63 and 64 so wound and connected as to act in opposition upon the relay armature 65. In this arrangement the coil 64 acts as the equivalent of one branch of the bridge circuit, the other branch of which includes the coil 63 in series with an adjustable resistance 66 and one or more of the control resistances as at 55, 55'. The relay 60 may be arranged to control a three-wire circuit similar to those of the above described embodiments. In Fig. 4 the resistances 55 and 55' respectively may be controlled by temperature variations and/or pressure variations in a manner similar to the resistances 28 and 30 of Fig. 1, or the resistance 55' may comprise for example, a "follow-up" resistance controlled in the same manner as resistance 56 of Fig. 2.

Fig. 4 also illustrates an example showing how the various embodiments of the circuit of this invention may be arranged for automatically altering the control circuit according to the time of day, by the use of a clock or equivalent timing device. For this purpose a two-way switch 67 may be provided in the circuit of resistances 55, 55', such switch being operated at predetermined times by a suitable well-known form of time clock mechanism 68, whereby the circuit may be completed alternatively through a resistance 69, or a relatively smaller resistance 69'. With such arrangements the resistance of the circuit may be automatically shifted from one value to another so that during the night-time or during holidays or week-ends, for example, the heat supply will continue to be regulated but at a lower temperature level.

Figure 5:
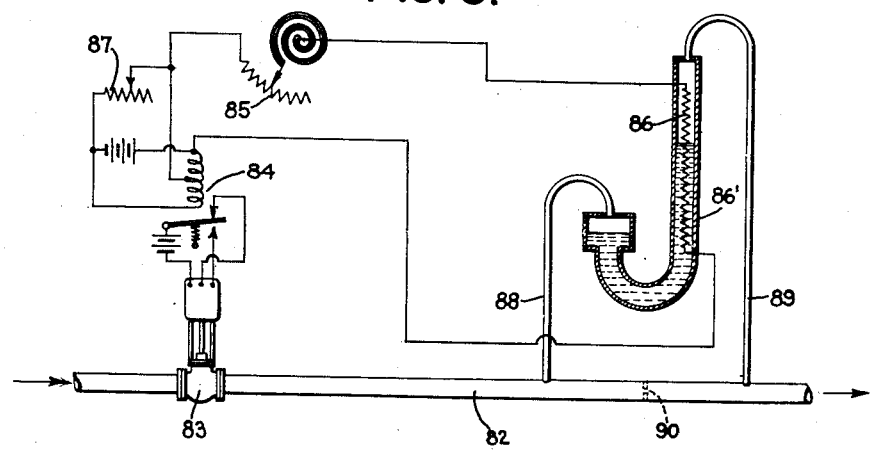
Fig. 5 illustrates one form of the circuit involving the invention as applied to an arrangement adapted to regulate the rate of flow of the fluid as distinguished from the arrangement in Fig. 1, which is adapted to regulate pressures.

The arrangements of Fig. 5 illustrate an example showing how the circuits embodying this invention may be used to regulate the rate of flow of fluid, through a steam main or other conduit 82. This conduit may be provided with a motor operated valve 83 similar to the above described valve arrangement of Fig. 1. Such valve may be controlled by a relay 84, which in turn may be controlled by a bridge circuit having in one of its branches a thermostatically adjustable resistance 85 and a pressure controlled resistance 86. The other branch may include a resistance as at 87. The pressure controlled resistance 86 may be mounted in a mercury U-tube as at 86', the ends of the U-tube being brought into communication respectively by conduits 88, 89 with the opposite sides of a fixed orifice plate 90 located in the conduit 82. It is thus apparent that the pressure drop across orifice 90 will control the position of the mercury column in U-tube 86', thereby controlling the value of the resistance 86. Upon variations of this pressure drop (if the temperature at the thermostat is not changed), the motor operated valve 83 will be moved in a direction tending to restore a predetermined normal pressure drop across orifice 90. The details of the operation of the bridge circuit of Fig. 5 will be apparent from the above described operation of the bridge circuit of Fig. 1. Since the operation of the valve and circuit are such as to tend to maintain a constant pressure drop across the orifice 90 (for a particular temperature at the thermostat) and since the quantity of fluid flowing through a fixed orifice will be constant with a constant pressure drop, it will be apparent that the system is such as to normally maintain a substantially constant rate of flow, for a given temperature. However, upon a change of temperature at the thermostat which controls resistance 85, the connections are such that the circuit will tend to maintain a balanced condition with the pressure drop and rate of flow changed to a corresponding extent. That is, for a lower temperature, for example, the rate of flow will be correspondingly increased. The variations in the rate of flow may be readily made either directly proportional to the temperature variations at the thermostatically controlled resistance 85, or otherwise, depending upon the spacings of the turns of the resistances at 85 or 86.

It will be understood that in each of the above described circuits one or more of the pressure controlled resistances may be used in series either with or without the accompanying use of one or more of the thermostatically controlled resistances and in some cases it may be found desirable to use a thermostatically controlled resistance or resistances without the pressure controlled resistance, depending upon the nature of the regulating problem at hand. Also, while in each of the above circuits it has been assumed that a relay may be used of a type designed to make contact with either one or the other of two contacts such as at 23 and 24 (Fig. 1), for always operating a motor in one direction or the other, yet well-known forms of relays may of course readily be used or so adjusted that when the two branches of the control circuit are in substantial balance, the relay will assume a neutral position, and not close either contact but will allow the motor to remain idle until the circuit balance is disturbed in one direction or the other.

Figure 6:
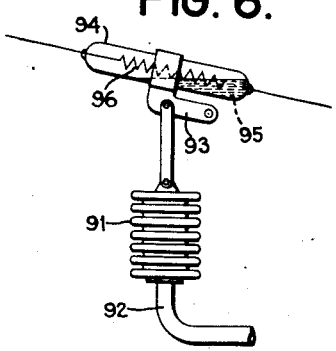
Fig. 6 illustrates an alternative form of enclosed pressure controlled resistance which may be used in the above mentioned circuits.
Figure 7:
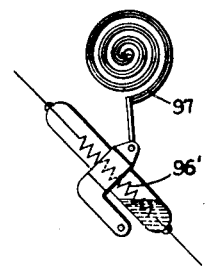
Fig. 7 illustrates an alternative form of enclosed thermostatically controlled resistance which may be used in the above mentioned circuits.
Figure 8:
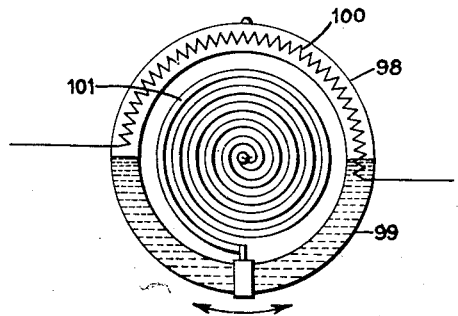
Fig. 8 illustrates a further possible modified embodiment of an enclosed control resistance element adapted for use in various of the above mentioned circuits.

Fig. 6 illustrates an alternative form of pressure controlled resistance which may be substituted in lieu of those shown and referred to in connection with the above described circuit diagrams. An expansible bellows element 91 is here shown in communication through a conduit 92, with the regulated flow of steam in the steam main or other source of pressure used in the regulating operation. The upper end of this expansible bellows may be connected by suitable linkage as at 93 to a tiltable enclosure 94, which may be a hermetically sealed glass tube containing a body of mercury as at 95 arranged to immerse more or less of a resistance element 96, depending upon the angle to which the container is tilted. It will be understood that the resistance 96 may be connected in a circuit in a manner similar to the resistance 30, for example. The shape of the container and the resistance element therein and its relationship to the body of mercury may be so designed as to cause the resistance to be varied with the desired relationship to the pressure changes occurring in the expansible bellows 91. Fig. 7 illustrates an arrangement similar to Fig. 6, whereby a similar enclosed resistance element 96' may be connected for operation by a thermostatic element 97. Fig. 8 illustrates another possible form of thermostatically controlled and enclosed resistance element comprised for example of a hermetically sealed ring-shaped glass tube 98 of circular cross-section and partially filled with a body of mercury or other conductive liquid as at 99. A coiled resistance element of arcuate form may be arranged as at 100 within this tube so that when the tube is turned to varying degrees about its horizontal axis, the resistance element will be immersed to a greater or lesser extent in the mercury. Such turning or rotation of the tube 98 may be effected by mounting the same upon a control element as at 101 comprising a thermostatic bi-metallic strip, or if desired a spiral tube element expansible in accordance with variations of pressure therein. This arrangement of Fig. 8 shows one possible convenient design by which the enclosed resistance element may be adjusted directly in proportion to the turning movement imparted by either a temperature or pressure responsive spiral element. Or if desired, by suitably winding the coiled resistance element 100, the relationship instead of being in direct proportion, may be made according to a square law or a logarithmic scale, or any other desired relationship, depending upon the requirements of the system being controlled. The same is also true of course of the resistance coil 30 in Fig. 1. In some cases, instead of using the resistance 30 as in Fig. 1, designed according to the square law as hereinabove explained, it may be found preferable to interpose the square law relationship in the thermostatic control device, in which event the arrangement of Fig. 8 may be used with the resistance 100 varying along its length according to the desired square law.

Figure 9:
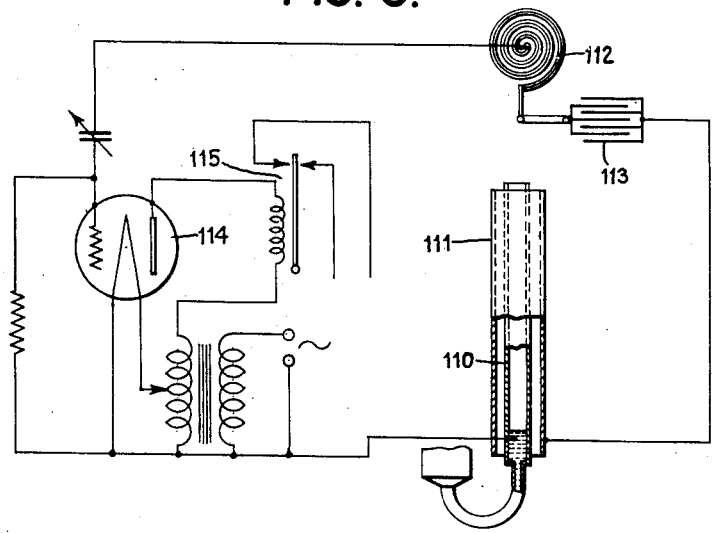
Fig. 9 illustrates another form of the circuit embodying amplifying means and adapted to utilize capacities, instead of resistances, as the circuit elements which are controlled by the temperature and/or pressure responsive devices.
Figure 10:
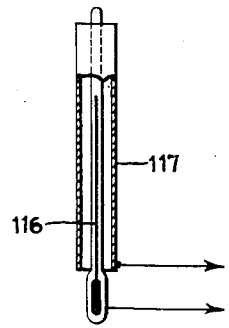
Fig. 10 illustrates an alternative form of thermostatically controlled adjustable capacity device which may be used in the circuit of Fig. 9, for example.

In some cases it may prove desirable to vary the electrical characteristics of the circuit by means other than through the use of variable resistances. For example, Fig. 9 illustrates a circuit arrangement using variable condensers. Here a mercury column 110, controlled by pressure conditions as in Fig. 1 or Fig. 5, may be so formed as to constitute in effect one plate of a variable condenser, of which the other plate 111 may comprise a stationary conductive element extending longitudinally and adjacent or encircling the mercury column. In this case also a thermostatic element 112 may be connected as shown to operate a variable condenser as at 113. The circuit of these variable condensers may include amplifying means as at 114 for operating a relay as at 115 adapted to assume either a neutral position or to make contact completing either one of two circuits as in the case of the relay of Fig. 1. Fig. 10 illustrates another possible form of thermostatically adjustable condenser element which may for example be embodied in the circuit of Fig. 9. In this case a mercury thermometer as at 116 may form one element of a variable condenser of which the other element may comprise a tubular condenser plate 117 surrounding the thermometer or closely adjacent thereto. Thus upon variations in the height of the mercury in the thermometer, the capacity of the condenser will be correspondingly varied.

Those types of heat regulating systems which are operated by compressed air may be conveniently thermostatically controlled by use of the above described circuits. That is, the circuits as shown instead of being connected to control a steam valve or the like, may be arranged to similarly control an air valve for controlling the flow of compressed air, which in turn may be used to control the heating system in various well-known ways.

It will thus be apparent that relatively simple forms of circuits may be provided according to this invention for interconnecting temperature, pressure and manual control elements without incurring the expense of multi-wire cables, and with the avoidance of any circuit breaking contacts of a nature liable to arcing and deterioration. And if the various resistances or equivalent elements used, are so made according to suitable well-known methods that they may be very gradually adjusted, then the regulation of the system may be made quite accurate throughout the range of temperatures and pressures encountered, and free of the inaccuracies of step-by-step regulation.

While the invention has been described in detail with respect to particular preferred examples, it will be understood by those skilled in the art after understanding the invention, that various further changes and further modifications may be made without departing from the spirit and scope of the invention, and it is intended therefore in the appended claims to cover all such changes and modifications, except for certain divisional species of the invention which are claimed in our divisional application Ser. No. 351,008, filed August 3, 1940.

What is claimed as new and desired to be secured by Letters Patent is:

1. In combination, an adjustable valve for variably controlling the supply of a fluid heating medium, a column of electrically conductive fluid, means for subjecting said column to the effect of pressure variations in such variably controlled medium whereby said column varies in height as a result of pressure variations in said medium, a resistance element partially immersed in said column whereby its effective resistance varies upon variations of the height of said column, a bridge circuit including said resistance in one of its branches, a thermostatically adjustable resistance in one of the branches of said circuit, and means controlled by said circuit for so operating said valve that the consequent variations of said column tend to normally maintain a predetermined distribution of the current between the branches of said bridge circuit.

2. Apparatus for controlling the supply of a fluid heating medium in a conduit, comprising a valve for variably admitting the fluid to the conduit, electrical means for variably adjusting said valve, a bridge circuit controlling said means, means affected by varying pressure conditions in the heating medium admitted by said valve for varying the relative resistance of the branches of said bridge circuit by amounts substantially proportional to the square of the variations in said pressure conditions, and whereby the adjustment of the valve under control of said circuit, together with said resistance variations tend to normally maintain a predetermined distribution of the current between the branches of said bridge circuit.

3. Apparatus for controlling the pressure of a fluid heating medium supplied to a heating system, comprising a valve for variably admitting the fluid to the system, electrical operating means for said valve, a bridge circuit controlling said operating means, a variable element for altering one branch of said bridge circuit with respect to the other, and means varied by the effective pressure of the heating medium as supplied to the heating system for varying said element by amounts substantially proportional to the square of the variations of said pressure, and whereby an increase or a decrease in said effective pressure so alters the relationship of the branches of said bridge circuit as to cause said valve to operate respectively to reduce or increase such effective pressure.

4. Apparatus for controlling the pressure of a fluid heating medium supplied to a heating system, comprising a valve for variably admitting the fluid to the system, electrical operating means for said valve, a bridge circuit controlling said operating means, a variable element for altering one branch of said bridge circuit with respect to the other, said other branch being normally fixed, means varied by the effective pressure of the heating medium as supplied to the heating system for varying said element, whereby an increase or a decrease in said effective pressure so alters the relationship of the branches of said bridge circuit as to cause said valve to operate respectively to reduce or increase such effective pressure, and a thermostatically controlled element for also altering said first named branch of said bridge circuit, whereby said pressure conditions are varied to alter the supply of heating medium substantially in accordance with the heating requirements when the temperature varies at said thermostatically controlled element.

5. Apparatus for controlling the pressure of a fluid heating medium supplied to a heating system, comprising a valve for variably admitting the fluid to the system, electrical operating means for said valve, a bridge circuit controlling said operating means, a variable element for altering one branch of said bridge circuit with respect to the other, said other branch being normally fixed, thermostatic means for varying said element, whereby an increase or a decrease in the temperature at said thermostatic means so alters the relationship of the branches of said circuit as to cause said valve to operate to variably reduce or increase respectively the quantity of heating medium supplied, another variable element in said first named branch and means for varying the latter in a direction tending to restore the relationship of the branches of said circuit and normally maintain a substantially predetermined distribution of the current between the branches of said bridge circuit, upon said operation of the valve, said last named means comprising a device actuated by variations in the pressure conditions in the heating medium as supplied through said valve.

6. Apparatus for controlling the supply of a fluid heating medium to a heating system, comprising a valve for variably admitting the fluid to the system, electrical operating means for said valve, a bridge circuit controlling said operating means, a variable element for altering one branch of said bridge circuit with respect to the other, means varied by the rate of flow of the heating medium as supplied to the heating system for varying said element, whereby an increase or a decrease in said rate of flow so alters the relationship of the branches of said bridge circuit as to cause said valve to operate respectively to reduce or increase such rate of flow, and a thermostatically controlled element for also altering one branch of said bridge circuit with respect to the other, whereby said rate of flow is varied to alter the supply of heating medium substantially in accordance with variations in the temperature at said thermostatically controlled element.

7. Apparatus for controlling the supply of a fluid heating medium to a heating system, comprising a valve for variably admitting the fluid to the system, electrical operating means for said valve, a bridge circuit controlling said operating means, a variable element for altering one branch of said bridge circuit with respect to the other, thermostatic means for varying said element, whereby an increase or a decrease in the temperature at said thermostatic means so alters the relationship of the branches of said circuit as to cause said valve to operate to variably reduce or increase respectively the quantity of heating medium supplied, a time controlled element in said circuit for also altering one branch with respect to the other to cause operation of said valve to reduce the quantity of heating medium supplied during predetermined periods, another variable element in said circuit and means for varying the latter by variations in pressure conditions in the heating medium as supplied through said valve, in a direction tending to restore the relationship of the branches of said circuit and normally maintain a substantially predetermined distribution of the current between the branches of said bridge circuit, upon said operations of the valve.

CHARLES G. BINDER.
LEROY H. PLUM.